United States Patent
Sun et al.

(10) Patent No.: US 11,805,468 B2
(45) Date of Patent: Oct. 31, 2023

(54) METHOD AND DEVICE FOR NETWORKING

(71) Applicant: BEIJING XIAOMI MOBILE SOFTWARE CO., LTD., Beijing (CN)

(72) Inventors: Hanbiao Sun, Beijing (CN); Liming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 44 days.

(21) Appl. No.: 17/335,013

(22) Filed: May 31, 2021

(65) Prior Publication Data
US 2022/0210717 A1 Jun. 30, 2022

(30) Foreign Application Priority Data

Dec. 28, 2020 (CN) .......................... 202011581339.7

(51) Int. Cl.
*H04W 40/24* (2009.01)
*H04W 76/14* (2018.01)
(Continued)

(52) U.S. Cl.
CPC ......... *H04W 40/246* (2013.01); *H04W 40/32* (2013.01); *H04W 72/542* (2023.01);
(Continued)

(58) Field of Classification Search
CPC ... H04W 40/12; H04W 40/22; H04W 40/246; H04W 40/32; H04W 72/085; H04W 76/14; H04W 84/18; H04W 92/20
See application file for complete search history.

(56) References Cited

U.S. PATENT DOCUMENTS 8,547,912 B1 10/2013 Breau et al.
2008/0069068 A1 3/2008 Dean
(Continued)

FOREIGN PATENT DOCUMENTS

CN 105072613 A 11/2015
CN 105392181 A 3/2016
(Continued)

OTHER PUBLICATIONS

Liu Zhi-min et al., "Key Technology and Experimental Research in Wireless Mesh Networks", ZTE Communications Technology, No. 02, Apr. 10, 2008, (5p).
(Continued)

*Primary Examiner* — Zhensheng Zhang
(74) *Attorney, Agent, or Firm* — Arch & Lake LLP

(57) ABSTRACT

A probe request sent by at least one second router is received. A router to be networked is determined from the at least one second router according to the probe request. A networking request carrying networking matching information is returned to the router to be networked. Wireless access of the first router is enabled. The networking matching information is provided to the router to be networked for networking matching. After the router to be networked has enabled wireless access of the router to be networked based on the networking request, networking is completed by establishing, based on wireless access of the first router and wireless access of the router to be networked, a connection with the router to be networked.

20 Claims, 9 Drawing Sheets

(51) Int. Cl.
H04W 40/32 (2009.01)
H04W 84/18 (2009.01)
H04W 72/542 (2023.01)
H04W 92/20 (2009.01)

(52) U.S. Cl.
CPC ........... *H04W 76/14* (2018.02); *H04W 84/18* (2013.01); *H04W 92/20* (2013.01)

(56) References Cited

U.S. PATENT DOCUMENTS

2014/0310075 A1* 10/2014 Ricci .................. B60W 50/085 705/13
2019/0069340 A1* 2/2019 Wang ................... H04W 12/06

FOREIGN PATENT DOCUMENTS

| CN | 106789273 | A | 5/2017 | |
|----|-----------|---|--------|---|
| CN | 110740460 | A | 1/2020 | |
| CN | 111277507 | A | 6/2020 | |
| CN | 111526510 | A | 8/2020 | |
| CN | 111866897 | A | 10/2020 | |
| CN | 111885680 | A | 11/2020 | |
| WO | 2017097093 | A1 | 6/2017 | |
| WO | WO-2019028839 | A1 * | 2/2019 | ............ H04W 16/28 |

OTHER PUBLICATIONS

Tian Qingjun et al., "Network analysis of switches and routers", China New Communications, vol. 14 No. 16, Aug. 20, 2017, (2p).

First Office Action of the Chinese application No. 202011581339.7, dated Dec. 30, 2021, (21 pages).

Supplementary European Search Report in the European application No. 21176754.6, dated Dec. 7, 2021, (11 pages).

"Secure NOmadic Wireless Mesh (SnowMesh) 802.11 TGs ESS Mesh Networking Proposal"N/A:" 11 05 0596 00 000s Snowmesh Doc; 11-05-0596-01-000s-11-05-0596-00-000S-snowmesh-doc",IEEE DRAFT; 11-05-0596-01-OOOS-11-05-0596-00-000SSNOWMESH-DOC IEEE-SA Mentor Piscataway, NJ USA vol. 802.11 s, No. 1, Jun. 21, 2005 (Jun. 21, 2005 ), pp. 1-56, XP017688981,[retrieved on Jun. 21, 2005], (56 pages).

* cited by examiner

METHOD AND DEVICE FOR NETWORKING

CROSS-REFERENCE TO RELATED APPLICATIONS

This application is based on and claims priority to Chinese Application No. 202011581339.7, filed on Dec. 28, 2020, the disclosure of which is hereby incorporated by reference in its entirety for all purposes.

BACKGROUND

In router networking in a mesh network, a router is generally added or included in a wired mode or a wireless mode. When networking routers wirelessly, a user may first click on a scan operation of an application of a mobile phone or a Personal Computer (PC) to actively discover the routers, and then click on an add operation to complete networking of the routers; or may complete networking of the routers by triggering networking buttons on both routers at the same time. However, with an existing router networking process, the operations are complicated and manual keying is required, with a low degree of intelligence and low efficiency.

SUMMARY

The present disclosure may relate to the field of wireless network communication. The present disclosure provides a method and device for networking.

According to an aspect of the present disclosure, there is provided a method for networking, including: receiving a probe request sent by at least one second router; determining a router to be networked from the at least one second router according to the probe request; returning a networking request carrying networking matching information to the router to be networked, and enabling wireless access of the first router, the networking matching information being provided to the router to be networked for networking matching; and after the router to be networked has enabled wireless access of the router to be networked based on the networking request, completing networking by establishing, based on wireless access of the first router and wireless access of the router to be networked, a connection with the router to be networked.

According to an aspect of the present disclosure, there is provided a method for networking, including: sending a probe request to a first router; receiving a networking request carrying networking matching information, the networking request being returned by the first router based on the probe request; in response to determining a router networking match according to the networking matching information, enabling wireless access of the router to be networked; and completing networking by establishing, based on wireless access of the router to be networked, a connection with the first router.

According to an aspect of the present disclosure, there is provided a device for networking, including at least a processor and a memory for storing processor executable instructions.

The processor is configured to execute the executable instructions to implement steps of the method of the first aspect or the second aspect.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Figure 1A:
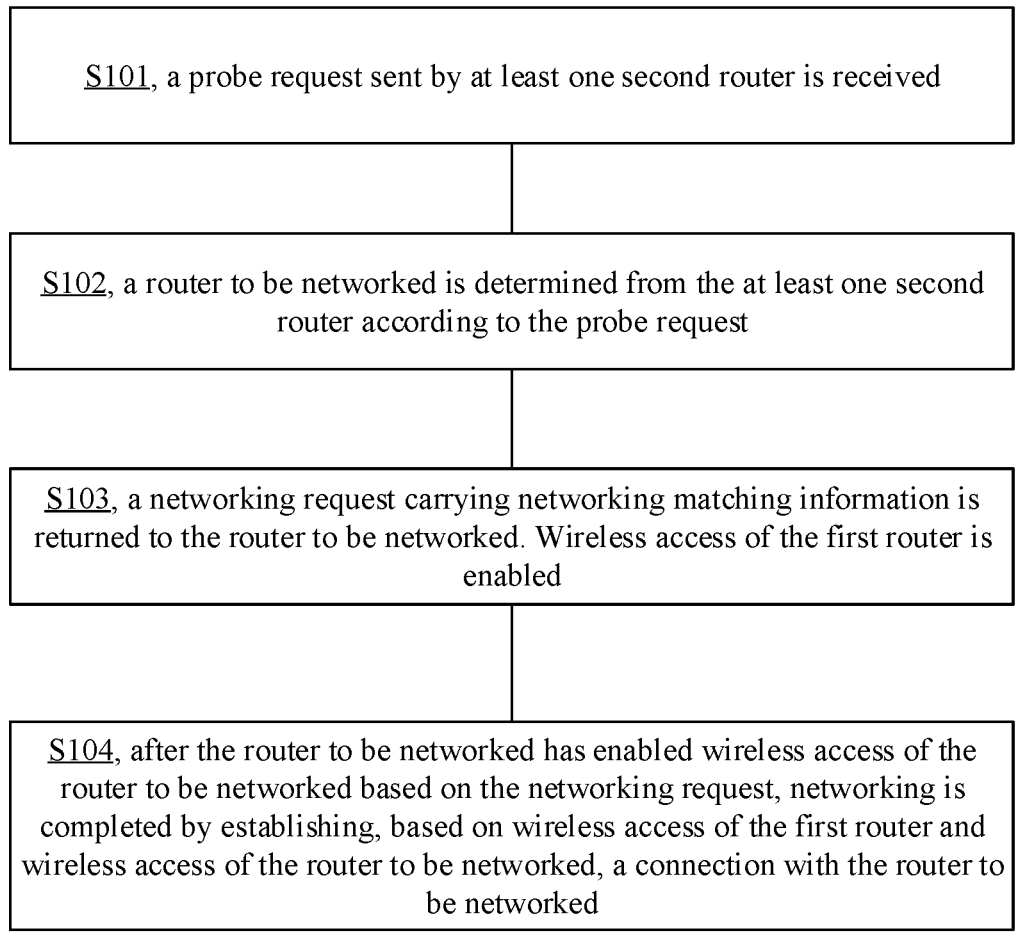
FIG. 1A is a flowchart 1 of a method for networking according to embodiments of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the subject disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

FIG. 1A is a flowchart 1 of a method for networking according to embodiments of the present disclosure. As shown in FIG. 1A, the method for networking is applied to a first router. The first router implements the method for networking, including steps as follows.

In S101, a probe request sent by at least one second router is received.

In S102, a router to be networked is determined from the at least one second router according to the probe request.

In S103, a networking request carrying networking matching information is returned to the router to be networked. Wireless access of the first router is enabled. The networking matching information is provided to the router to be networked for networking matching.

In S104, after the router to be networked has enabled wireless access of the router to be networked based on the networking request, networking is completed by establishing, based on wireless access of the first router and wireless access of the router to be networked, a connection with the router to be networked.

In embodiments of the present disclosure, the method for networking may be applied to a scene of mesh networking of multiple routers. In mesh networking, any access network gateway node may be used as a router to send and receive signals, and each node may directly communicate with one or more peer nodes, rendering flexible networking, reducing interaction redundancy, increasing a communication speed.

The first router may be a router that has been mesh networked. The second router may be a router that has not been mesh networked.

Figure 1B:
FIG. 1B is an illustrative diagram of monitoring by a router according to embodiments of the present disclosure.
Figure 2:
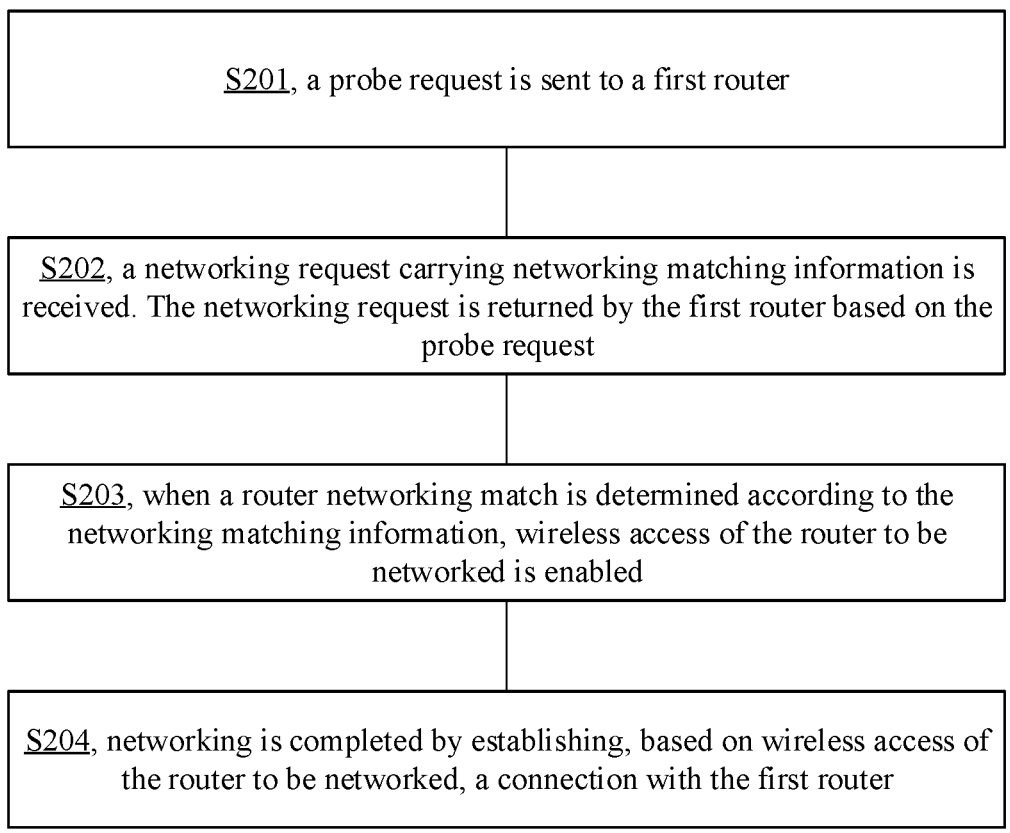
FIG. 2 is a flowchart 2 of a method for networking according to embodiments of the present disclosure.

The first router may monitor a probe request sent by the second router. After the first router has monitored the probe request, the first router may receive the probe request sent by the second router. It should be noted that the first router may monitor a probe request sent by the second router, and the second router may monitor a response request sent by the first router based on the probe request. As shown in FIG. 1B, a second router is a router within a monitored range monitored by the first router, and the first router is a router within a monitored range monitored by the second router.

In embodiments of the present disclosure, the probe request includes an equipment vendor field. The equipment vendor field is in a format shown in the table as follows.

| ID | length | organization identifier | equipment vendor customized content |
|---|---|---|---|

The equipment vendor customized content may include an address of a second router and an equipment state of the second router, which is not limited in embodiments of the present disclosure.

The address of a second router is used for determining the location of the second router. The address may be a MAC address or an IP address, but is not limited thereto. The equipment state of a second router may include, but is not limited to, an uninitialized state, an initialized state, or a networking state. With embodiments of the present disclosure, it may be determined, through the equipment state of a second router, whether to continue to determine a router to be networked from at least one second router. For example, when a second router is in the initialized state or the networking state, it indicates that the second router is going through, or has completed, networking configuration. In this case, it may be confirmed that the second router is not a router to be networked, and no further judgment is required.

The probe request is used for determining a router to be networked. In some embodiments, a router to be networked may be determined via the address of a second router, the equipment of the second router, and the signal strength of a signal of the second router as received by the first router.

After a router to be networked has been determined, the first router may return a networking request carrying networking matching information to the router to be networked. The networking matching information may be provided to the router to be networked for networking matching, so that the router to be networked is mesh networked with the first router.

In embodiments of the present disclosure, the networking matching information of the networking request may be formed by an equipment vendor field. The equipment vendor field has an organization identifier of the first router, a first address of a router to be networked in equipment vendor customized content, and an equipment state of the first router in the equipment vendor customized content.

Illustratively, the networking matching information may include the first address of a router to be networked, the organization identifier of the first router, and the equipment state of the first router, which is not limited in embodiments of the present disclosure.

In embodiments of the present disclosure, wireless access of the first router is enabled after the router to be networked has been determined. Wireless access to the first router may be enabled by creating a first interface and enabling wireless access on the first interface. In this way, with embodiments of the present disclosure, a connection with the router to be networked may be established through a wireless access signal of the first interface.

The first interface includes, but is not limited to, a Wi-Fi interface. The Wi-Fi interface is a wireless encrypted authentication communication interface that enables Wi-Fi Protected Setup (WPS). Wireless access may be provided via the Wi-Fi interface, to establish a connection between the first router and the router to be networked.

In embodiments of the present disclosure, the router to be networked is within a wireless access range for accessing the first router. After the router to be networked has enabled wireless access of the router to be networked based on the networking request, a connection with the router to be networked may be established based directly on wireless access of the first router and wireless access of the router to be networked, so as to complete networking. In addition, after completing networking, both the first router and the router to be networked are networked.

It should be noted that the connection between the first router and the router to be networked may be a Wi-Fi connection for data transmission between the first router and the router to be networked. For example, the first router may send configuration information to the router to be networked through the Wi-Fi connection. Alternatively, when the configuration information of the first router changes, changed configuration information is sent to the router to be networked through the Wi-Fi connection. Alternatively, collaboration such as roaming between the first router and the router to be networked is implemented via the Wi-Fi connection.

In embodiments of the present disclosure, the first router first determines a router to be networked by receiving a probe request, and then makes the router to be networked enable wireless access by returning a networking request to the router to be networked, so as to establish a connection with the router to be networked. That is, with embodiments of the present disclosure, networking is implemented via information exchange between the first router and the router to be networked, and it is not required to determine the router to be networked by manually clicking on a scan operation, or to establish a connection by manually clicking on an add operation to complete networking, simplifying operations, completing networking quickly, improving a degree of intelligence and efficiency of router networking.

In some embodiments, the probe request carries an address of the at least one second router. The router to be networked may be determined from the at least one second router according to the probe request as follows.

A signal strength of a signal of the at least one second router as received by the first router may be determined based on the probe request received.

When there is one second router and an address of the one second router is in a list of addresses to be networked, the one second router may be taken as the router to be networked.

When there are multiple second routers and addresses of the multiple second routers are all in the list of addresses to be networked, one or more of the multiple second routers may be selected as the router to be networked based on at least one of: signal strengths of signals of the multiple second routers as received by the first router; or reception time when the first router receives probe requests of the multiple second router.

In embodiments of the present disclosure, the first router may first receive a probe request through an antenna, and then measure the signal strength of the signal of a second router as received by the first router through a frame signal of the probe request.

It should be noted that in determining the signal strength of the signal of the second router as received by the first router according to the probe request received, with embodiments of the present disclosure, the signal strength of the signal of the second router as received by the first router may be measured according to the frame signal of the probe request. That is, the first router may acquire the signal strength of the second router by measuring the signal strength of the frame signal of the probe request received.

In embodiments of the present disclosure, multiple addresses to be networked included in the list of addresses to be networked are addresses that meet a networking requirement. For example, the multiple addresses to be networked are addresses in a networking range, and may also be addresses of routers in a working state, which is not limited in embodiments of the present disclosure.

One or more of multiple second routers may be selected as the router to be networked based on at least one of: signal strengths of signals of the multiple second routers as received by the first router; or reception time when the first router receives probe requests of the multiple second router, as follows.

Of the multiple second routers, a second router with the greatest signal strength may be selected as the router to be networked. Alternatively, of the multiple second routers, one or more second routers with signal strengths greater than a signal reception threshold may be selected as the router to be networked. Alternatively, of the multiple second routers, one or more second routers corresponding to reception time greater than a time threshold may be selected as the router to be networked. Alternatively, when at least two of the multiple second routers have identical signal strengths, one or more second routers corresponding to reception time greater than a time threshold may be selected as the router to be networked. Alternatively, a signal measurement time may be determined according to the reception time of receiving probe requests of the multiple second routers, and one or more second routers with signal strengths greater than a signal reception threshold may be selected as the router to be networked within the signal measurement time.

In embodiments of the present disclosure, during networking, when multiple second routers are selected as the router to be networked, the multiple second routers may be networked sequentially or simultaneously, which is not limited in embodiments of the present disclosure.

The signal reception threshold and the time threshold may be set according to an actual condition. For example, the signal reception threshold may be in the range of −70 dBm to −120 dBm, and the time threshold may be in the range of 1 millisecond to 3 milliseconds, which is not limited in embodiments of the present disclosure.

In embodiments of the present disclosure, the first router can determine the router to be networked respectively when there are one or more second routers, so that the determination of the router to be networked may be applicable to different situations, improving universality of an applicable scene. Moreover, with embodiments of the present disclosure, a router to be networked is determined without requiring any manual operation by the user, improving a degree of intelligence and efficiency of router networking.

In some embodiments, the probe request carries an organization identifier of the at least one second router and an equipment state of the at least one second router, and the method further includes an option as follows.

A signal strength of a signal of the at least one second router as received by the first router may be determined based on the probe request received.

When an organization identifier of the first router is identical to the organization identifier of the at least one second router, and the equipment state of the at least one second router is an uninitialized state, it may be determined whether the signal strength is greater than or equal to a preset signal strength threshold.

When the signal strength is greater than or equal to the preset signal strength threshold, first prompt information may be output. The first prompt information may be for prompting networking authorization.

In embodiments of the present disclosure, when the equipment state of a second router is an uninitialized state, it indicates that the second router has not been networked, and then the uninitialized second router may be taken as a candidate gateway to continue to determine whether the second router is a router to be networked.

The preset signal strength threshold may be set according to an actual situation. For example, the preset signal strength threshold may be in the range of −30 dBm to −120 dBm, which is not limited in embodiments of the present disclosure.

In embodiments of the present disclosure, the first prompt information may be output as follows. The first prompt information may be output by flashing an LED light. Alternatively, the first prompt information may be output by voice. Alternatively, the first prompt information may be output by displaying an animation.

The first prompt information is used for prompting that networking authorization is required. In this way, the user can be notified in time, so that the user can quickly grant an authorization according to the first prompt information.

In embodiments of the present disclosure, after the first router has output the first prompt information, the user may complete authorization based on different first prompt information. For example, when the first prompt information is a flashing LED light prompt, the user completes authorization by pressing an authorization key. As another example, when the first prompt information is a voice prompt, the user completes authorization by pressing the authorization key.

In embodiments of the present disclosure, the first router may determine, through the signal strength, the organization identifier of a second router carried in a probe request, and the equipment state of the second router, that the second router is to be networked, and thereby prompt the user to grant authorization in time.

In some embodiments, the method further includes:
before determining the router to be networked, receiving authorization information returned based on the first prompt information.

In embodiments of the present disclosure, authorization information is configured to indicate that at least one second router is authorized to be networked. Thus, after the first router has received the authorization information, the first router may select one or more of at least one second routers as the router to be networked to implement networking. In this way, the first router determines the router to be networked and performs networking when authorized, reducing unauthorized networking, improve user experience.

Illustratively, the authorization information may be generated by triggering a key on the first router, or may be sent by triggering an application of terminal equipment. The terminal equipment includes, but is not limited to, a mobile phone, a notebook or a tablet computer, which is not limited in embodiments of the present disclosure.

In some embodiments, the method further includes an option as follows.

When the organization identifier of the first router differs from the organization identifier of the at least one second router, or the equipment state of the at least one second router is an equipment state other than the uninitialized state, it may be continued to monitor the probe request.

In embodiments of the present disclosure, when the organization identifier of the first router differs from the organization identifier of the at least one second router, or the equipment state of the at least one second router is an equipment state other than the uninitialized state, it may indicate that the second router that has sent the probe request does not meet the networking requirement. In this case, it is not necessary to determine the router to be networked from the at least one second router according to the probe request received. In this way, with embodiments of the present disclosure, it is determined in advance via the organization identifier of a second router and the equipment state of the second router, whether the first router is to continue networking, reducing networking steps, improving networking efficiency.

In some embodiments, the method further includes an option as follows.

After the connection with the router to be networked has been established, configuration information may be sent to the router to be networked. The configuration information may be configured for the router to be networked to implement synchronization of networking information of the first router in networking access.

In embodiments of the present disclosure, after a second router to be networked has been configured based on the configuration information, networking of the router to be networked is completed.

The configuration information may be configured for the router to be networked to implement synchronization of networking information of the first router in networking access. The networking information is set information of the first router. For example, the networking information includes a service set identifier, a wireless name, a password, an encryption mode, etc., which is not limited in embodiments of the present disclosure.

In some embodiments, the method further includes an option as follows.

An equipment state of the first router may be updated.

An updated equipment state of the first router and a first address of the router to be networked may be included in a preset field in the networking request to be returned by the first router, acquiring the networking matching information.

In embodiments of the present disclosure, when the router to be networked is determined, the organization identifier of the first router remains unchanged. For example, the organization identifier of the first router is identical to the organization identifier of the first router initialized during networking.

It should be noted that the networking matching information carried in the networking request may be content of an equipment vendor field. The networking request may be a Beacon or a probe response request corresponding to a probe request. The preset field may be a customized field in the equipment vendor field.

The Beacon may be a frame used by each router to broadcast a signal per se, and may be sent at preset intervals, for identifying the presence of the router.

In some embodiments, the method further includes an option as follows.

After networking has completed, second prompt information may be output. The second prompt information may be configured for indicating completion of networking.

In embodiments of the present disclosure, it is indicated that networking has completed via the second prompt information. In this way, a networking condition is broadcast conveniently in time, improving user experience.

Embodiments of the present disclosure further provides a method for networking, applied to a router to be networked. The router to be networked implements the method for networking, including steps as follows.

In S201, a probe request is sent to a first router.

In S202, a networking request carrying networking matching information is received. The networking request is returned by the first router based on the probe request.

In S203, when a router networking match is determined according to the networking matching information, wireless access of the router to be networked is enabled.

In S204, networking is completed by establishing, based on wireless access of the router to be networked, a connection with the first router.

In embodiments of the present disclosure, the router to be networked is determined by the first router from at least one second router according to the probe request. The router to be networked is a second router in at least one second router, that meets a networking condition.

A second router meeting the networking condition may be determined as follows. When there is one second router and an address of the one second router is in a list of addresses to be networked, the one second router may be determined as a second router meeting the networking condition. Alternatively, when there are multiple second routers, a second router with the greatest signal strength thereof may be determined as a second router meeting the networking condition. Alternatively, of the multiple second routers, one or more second routers with signal strengths greater than a signal reception threshold may be determined as the second router meeting the networking condition. Alternatively, when there are multiple second routers and at least two of the multiple second routers have identical signal strengths, one or more second routers corresponding to reception time greater than a time threshold may be determined as the second router meeting the networking condition.

In embodiments of the present disclosure, the networking matching information includes an organization identifier of the first router, an equipment state of the first router, and a first address.

In embodiments of the present disclosure, the router networking match may be determined according to the networking matching information as follows.

When an organization identifier of the router to be networked is identical to the organization identifier of the first router, a second address of the router to be networked is identical to the first address in the networking matching information, and the equipment state of the first router is a networking state, the router networking match may be determined.

The first address may be identical to the second address, indicating that the address in the networking matching information is the address of the router to be networked.

In embodiments of the present disclosure, when the organization identifier of the router to be networked is identical to the organization identifier of the first router, the first address of the router to be networked is identical to the second address of the router to be networked, and the equipment state of the first router is a networking state, the second router may determine the router networking match, and then the second router may complete networking by enabling wireless access and establishing a connection with the first router.

When the router networking match is determined, wireless access of the router to be networked may be enabled. Wireless access of the router to be networked may be enabled by creating a second interface and enabling wireless access on the second interface. In this way, with embodiments of the present disclosure, a connection with a second router may be established through a wireless access signal of the second interface.

The second interface includes, but is not limited to, a Wi-Fi interface. The Wi-Fi interface is a wireless encrypted authentication communication interface that enables Wi-Fi Protected Setup (WPS). Wireless access may be provided via the Wi-Fi interface, to establish a connection with the second router.

In embodiments of the present disclosure, after wireless access of the first router has been enabled, a connection with the first router may be established based on wireless access of the router to be networked.

It should be noted that the connection between the first router and the router to be networked may be a Wi-Fi connection for data transmission between the first router and the router to be networked. For example, the first router may send configuration information to the router to be networked through the Wi-Fi connection. Alternatively, when the configuration information of the first router changes, changed configuration information is sent to the router to be networked through the Wi-Fi connection. Alternatively, collaboration such as roaming between the first router and the router to be networked is implemented via the Wi-Fi connection.

In embodiments of the present disclosure, the router to be networked first receives the networking matching information returned by the first router, and when determining the router networking match according to the networking matching information, wireless access of the router to be networked is enabled to establish a connection with the first router. That is, with embodiments of the present disclosure, networking is implemented via information exchange between the router to be networked and the first router, and it is not required to complete networking via a clicking operation or a keying operation, completing networking quickly, improving a degree of intelligence and efficiency of router networking.

In some embodiments, the method further includes an option as follows.

after the connection with the first router has been established, configuration information sent by the first router may be received.

Synchronization of networking information of the first router in networking access may be implemented based on the configuration information.

In embodiments of the present disclosure, the configuration information may be configured for the router to be networked to implement synchronization of networking information of the first router in networking access. The networking information is set information of the first router. For example, the networking information includes a service set identifier, a wireless name, a password, an encryption mode, etc., which is not limited in embodiments of the present disclosure.

After the second router to be networked has been configured based on the configuration information, networking of the router to be networked is completed.

For a better understanding of the above embodiments, the following examples are proposed.

Figure 3:
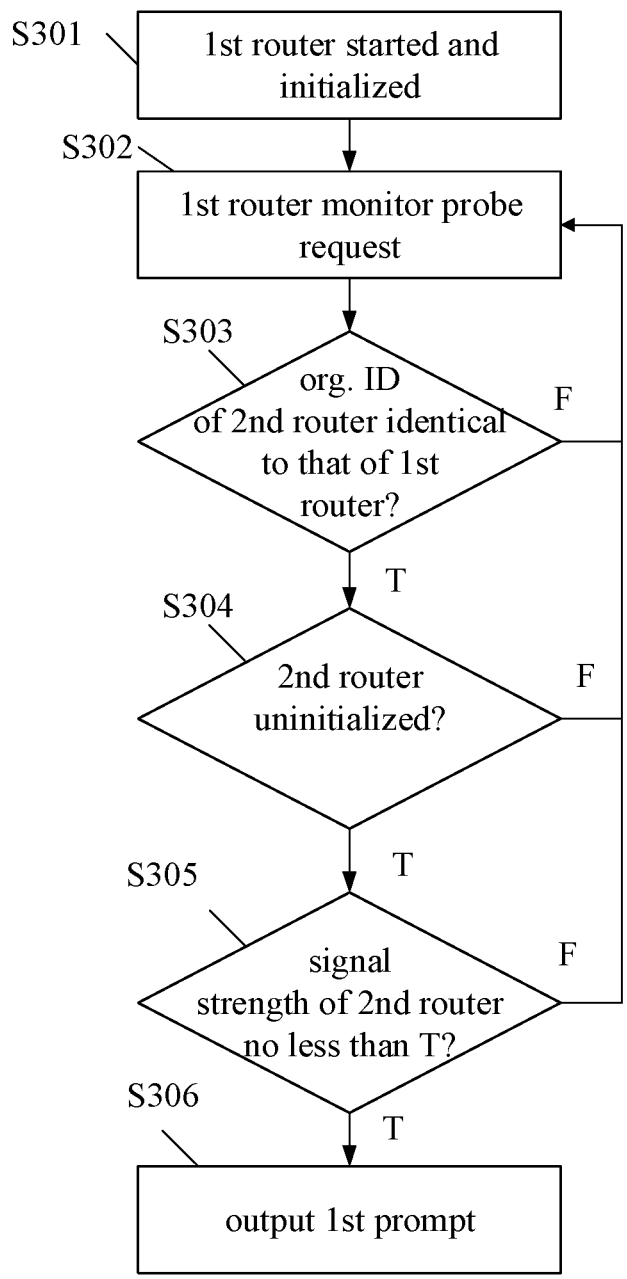
FIG. 3 is a flowchart of outputting a prompt according to embodiments of the present disclosure.

FIG. 3 is a flowchart of initializing the first router and outputting first prompt information. As shown in FIG. 3, the first router may be initialized and first prompt information may be output as follows.

In S301, a first router may be started and initialized.

In S302, the first router may monitor a probe request.

In S303, it may be determined whether an organization identifier of a second router in an equipment vendor field carried by the probe request is identical to an organization identifier of the first router. If they are identical, S304 may be performed. Otherwise if they differ, S302 may be performed.

In S304, it may be determined whether an equipment state of the second router in the equipment vendor field carried by the probe request is an uninitialized state. If it is the uninitialized state, S305 may be performed. Otherwise if it is not the uninitialized state, S302 may be performed.

In S305, it may be determined whether a signal strength of a signal sent by the second router as received by the first router is greater than or equal to a preset signal strength threshold. If the signal strength is greater than or equal to the preset signal strength threshold, S306 may be performed. Otherwise if the signal strength is less than the preset signal strength threshold, S302 may be performed.

In S306, first prompt information may be output.

In embodiments of the present disclosure, a wireless drive of the first router performs monitoring, determines the organization identifier, and determines the equipment state. After S304, the wireless drive of the first router sends the signal strength of the second router to a monitoring program of the first router, and performs S305 and S306 via the monitoring program.

Figure 4:
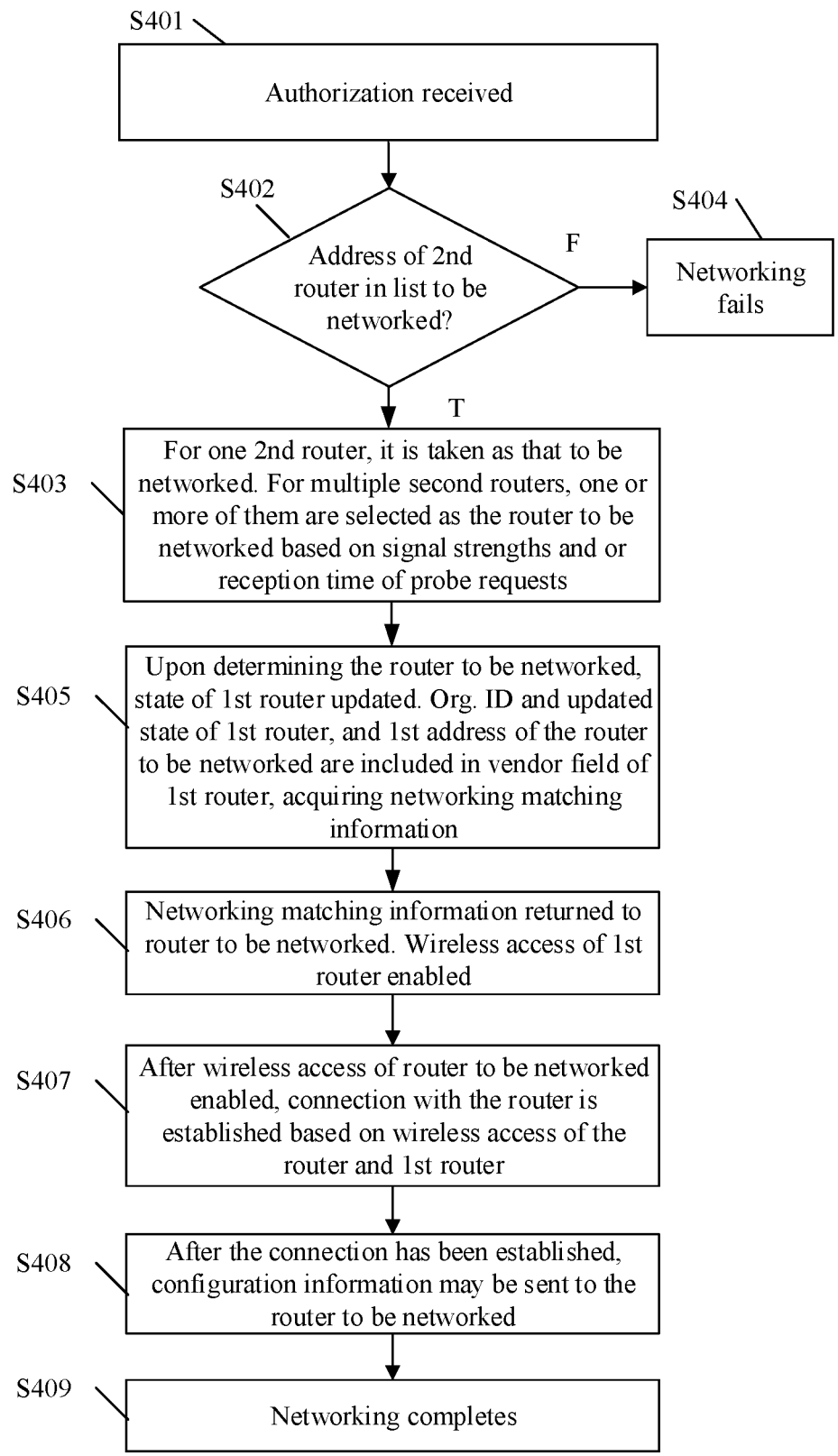
FIG. 4 is a flowchart of completing networking by a first router according to embodiments of the present disclosure.

FIG. 4 is a flowchart of completing networking by a first router. As shown in FIG. 4, the first router may complete networking as follows.

In S401, authorization information returned based on the first prompt information may be received.

In S402, it may be determined whether an address of a second router is in a list of addresses to be networked. If it is in the list, S403 may be performed. Otherwise if it is not in the list, S405 may be performed.

In S403, when there is one second router, the one second router may be taken as the router to be networked. When there are multiple second routers, one or more of the second routers may be selected as the router to be networked based on at least one of: signal strengths of signals of the multiple second routers as received by the first router; or reception time when the first router receives probe requests of the multiple second routers.

In S404, networking fails.

In S405, when the router to be networked is determined, an equipment state of the first router may be updated. The organization identifier of the first router, an updated equipment state of the first router, and a first address of the router to be networked may be included in a vendor field of the first router, acquiring the networking matching information.

In S406, a networking request carrying the networking matching information is returned to the router to be networked. Wireless access of the first router is enabled.

In S407, after the router to be networked has enabled wireless access of the router to be networked based on the networking request, a connection with the router to be networked is established based on wireless access of the first router and wireless access of the router to be networked.

In S408, after the connection has been established, configuration information may be sent to the router to be networked.

In S409, networking completes.

Figure 5:
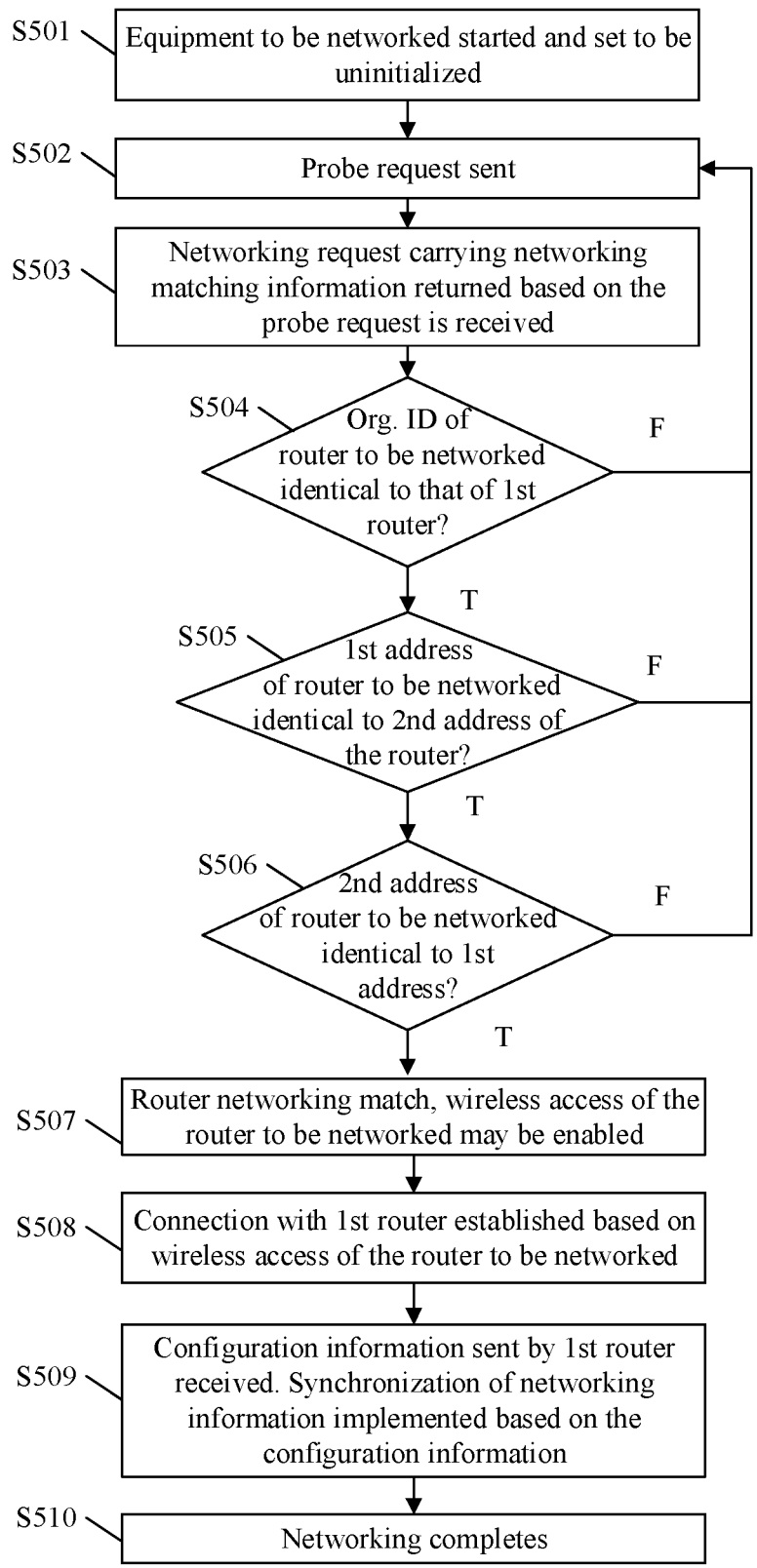
FIG. 5 is a flowchart of completing networking by a router to be networked according to embodiments of the present disclosure.

FIG. 5 is a flowchart of completing networking by a router to be networked. As shown in FIG. 5, the router to be networked may complete networking as follows.

In S501, equipment to be networked may be started. An equipment state of the equipment to be networked may be set to an uninitialized state.

In S502, a probe request may be sent.

In S503, a networking request carrying networking matching information returned based on the probe request is received. The networking matching information includes an organization identifier of a first router, an updated equipment state of the first router, and a first address of the router to be networked.

In S504, it may be determined whether the organization identifier of the router to be networked is identical to the organization identifier of the first router. If they are identical, S505 may be performed. Otherwise if they differ, S502 may be performed.

In S505, it may be determined whether the equipment state of the first router is a networking state. If the equipment state is the networking state, S506 may be performed. Otherwise if the equipment state is not the networking state, S502 may be performed.

In S506, it may be determined whether the second address of the router to be networked is identical to the first address. If they are identical, S506 may be performed. Otherwise if they differ, S502 may be performed.

In S507, in response to a router networking match, wireless access of the router to be networked may be enabled.

In S508, a connection with the first router may be established based on wireless access of the router to be networked.

In S509, configuration information sent by the first router may be received. Synchronization of networking information of the first router in networking access may be implemented based on the configuration information.

In S510, networking completes.

In embodiments of the present disclosure, the first router and at least one second router interact to network at least one second router quickly, improving a degree of intelligence and efficiency in networking.

Figure 6:
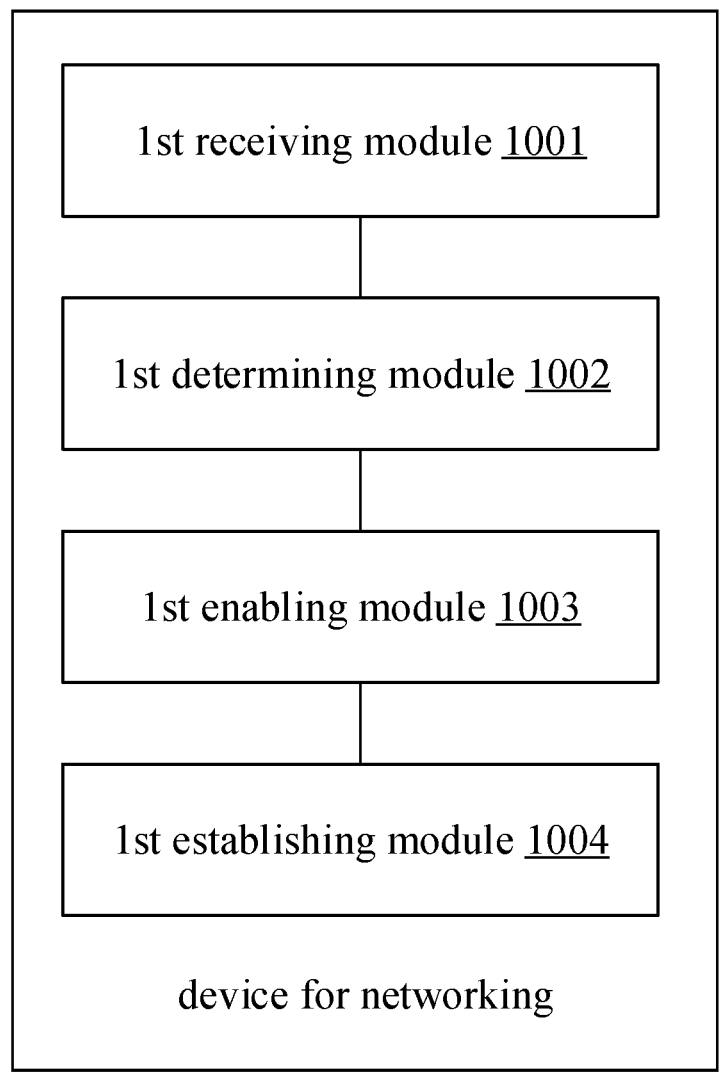
FIG. 6 is an illustrative diagram 1 of a device for networking according to embodiments of the present disclosure.

FIG. 6 is an illustrative diagram 1 of a device for networking according to an illustrative embodiment. Referring to FIG. 6, the device for networking includes a first receiving module 1001, a first determining module 1002, a first enabling module 1003, and a first establishing module 1004.

The first receiving module 1001 is configured to receive a probe request sent by at least one second router.

The first determining module 1002 is configured to determine a router to be networked from the at least one second router according to the probe request.

The first enabling module 1003 is configured to return a networking request carrying networking matching information to the router to be networked, and enable wireless access of the first router. The networking matching information is provided to the router to be networked for networking matching.

The first establishing module 1004 is configured to, after the router to be networked has enabled wireless access of the router to be networked based on the networking request, complete networking by establishing, based on wireless access of the first router and wireless access of the router to be networked, a connection with the router to be networked.

In some embodiments, the probe request carries an address of the at least one second router.

The first determining module may be further configured to: determine, based on the probe request received, a signal strength of a signal of the at least one second router as received by the first router; in response to the at least one second router being one second router and an address of the one second router being in a list of addresses to be networked, take the one second router as the router to be networked; and in response to the at least one second router being multiple second routers and addresses of the multiple second routers being all in the list of addresses to be networked, select one or more of the multiple second routers as the router to be networked based on at least one of: signal strengths of signals of the multiple second routers as received by the first router; or reception time when the first router receives probe requests of the multiple second routers.

In some embodiments, the probe request carries an organization identifier of the at least one second router and an equipment state of the at least one second router. The device further includes:
- a second determining module configured to determine, based on the probe request received, a signal strength of a signal of the at least one second router as received by the first router; in response to an organization identifier of the first router being identical to the organization identifier of the at least one second router, and the equipment state of the at least one second router being an uninitialized state, determine whether the signal strength is greater than or equal to a preset signal strength threshold;
- a first outputting module configured to, in response to the signal strength being greater than or equal to the preset signal strength threshold, output first prompt information prompting networking authorization.

In some embodiments, the device further includes:
- an authorization module configured to, before determining the router to be networked, receive authorization information returned based on the first prompt information.

In some embodiments, the device further includes:
- a monitoring module configured to, in response to the organization identifier of the first router differing from the organization identifier of the at least one second router, or the equipment state of the at least one second router being an equipment state other than the uninitialized state, continue to monitor the probe request.

In some embodiments, the device further includes:
- a first sending module configured to, after establishing the connection with the router to be networked, send configuration information to the router to be networked. The configuration information may be for the router to be networked to implement synchronization of networking information of the first router in networking access.

In some embodiments, the device further includes:
- an updating module configured to update an equipment state of the first router; and
- an including module configured to include, in a preset field in the networking request to be returned by the first router, an updated equipment state of the first router and a first address of the router to be networked, acquiring the networking matching information.

In some embodiments, the device further includes:
- a second outputting module configured to, after completing networking, output second prompt information indicating completion of networking.

Figure 7:
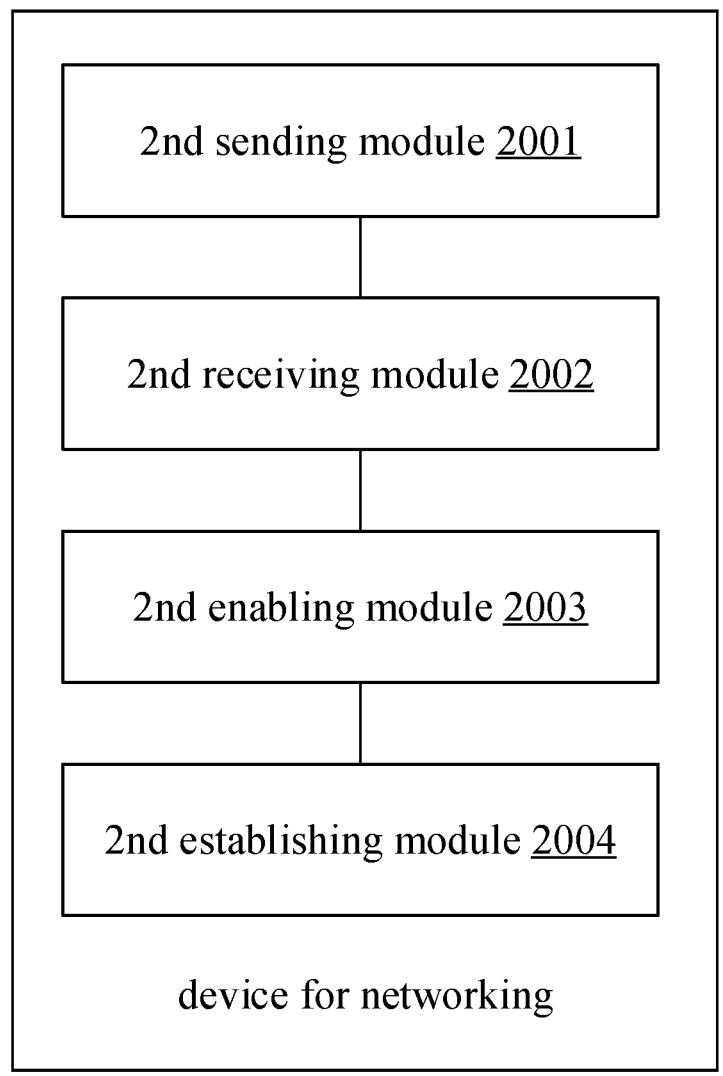
FIG. 7 is an illustrative diagram 2 of a device for networking according to embodiments of the present disclosure.

FIG. 7 is an illustrative diagram 2 of a device for networking according to an illustrative embodiment. Referring to FIG. 7, the device for networking includes a second sending module 2001, a second receiving module 2002, a second enabling module 2003, and a second establishing module 2004.

The second sending module 2001 is configured to send a probe request to a first router.

The second receiving module 2002 is configured to receive a networking request carrying networking matching information. The networking request is returned by the first router based on the probe request.

The second enabling module 2003 is configured to, in response to determining a router networking match according to the networking matching information, enable wireless access of the router to be networked.

The second establishing module 2004 is configured to complete networking by establishing, based on wireless access of the router to be networked, a connection with the first router.

In some embodiments, the networking matching information includes an organization identifier of the first router, an equipment state of the first router, and a first address.

The second enabling module may be further configured to, in response to an organization identifier of the router to be networked being identical to the organization identifier of the first router, a second address of the router to be networked being identical to the first address in the networking matching information, and the equipment state of the first router being a networking state, determine the router networking match.

In some embodiments, the device may further include:
- a third receiving module configured to, after establishing the connection with the first router, receive configuration information sent by the first router; and
- a synchronizing module configured to implement, based on the configuration information, synchronization of networking information of the first router in networking access.

A module of the device according to an aforementioned embodiment herein may perform an operation in a mode elaborated in an aforementioned embodiment of the method herein, which will not be repeated here.

Figure 8:
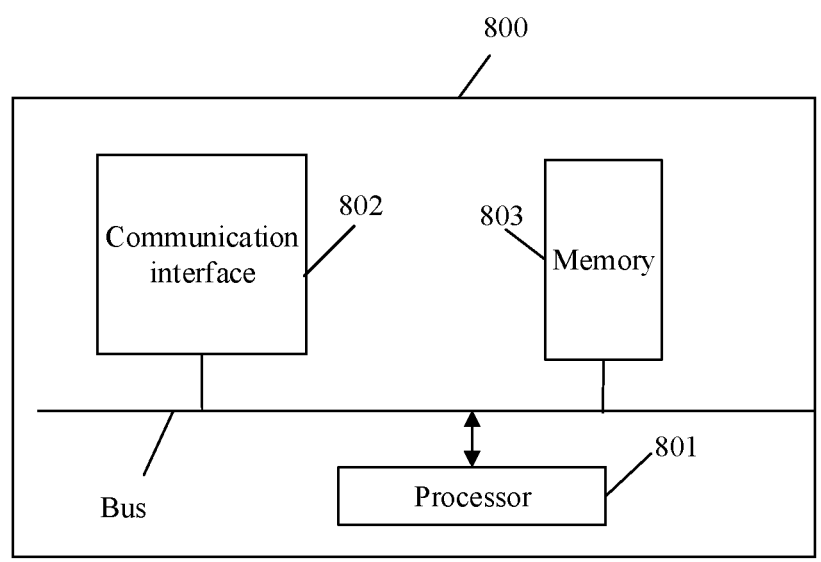
FIG. 8 is a block diagram of a device for networking according to embodiments of the present disclosure.

FIG. 8 is a block diagram of a device for networking according to an illustrative embodiment. Referring to FIG. 8, the device 800 for networking includes a processor 801, a communication interface 802, and a memory 803.

The processor 801 generally controls the overall operation of the device for networking.

The communication interface 802 may cause the device for networking to communicate with another terminal or server via a network.

The memory 803 is configured to store applications and instructions executable by the processor 801, and may also cache data to be processed or already processed by modules in the device for networking and the processor 801, and may be implemented by a flash memory or a Random Access Memory (RAM).

A transitory or non-transitory computer-readable storage medium has stored therein instructions which, when executed by a processor of terminal equipment, allow a device for networking to perform the method for networking in one or more embodiments herein.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

According to an aspect of embodiments of the present disclosure, there is provided a method for networking, including:
  receiving a probe request sent by at least one second router;
  determining a router to be networked from the at least one second router according to the probe request;
  returning a networking request carrying networking matching information to the router to be networked, and enabling wireless access of the first router, the networking matching information being provided to the router to be networked for networking matching; and
  after the router to be networked has enabled wireless access of the router to be networked based on the networking request, completing networking by establishing, based on wireless access of the first router and wireless access of the router to be networked, a connection with the router to be networked.

In some embodiments, the probe request carries an address of the at least one second router, and determining the router to be networked from the at least one second router according to the probe request includes:
  determining, based on the probe request received, a signal strength of a signal of the at least one second router as received by the first router;
  in response to the at least one second router being one second router and an address of the one second router being in a list of addresses to be networked, taking the one second router as the router to be networked; and
  in response to the at least one second router being multiple second routers and addresses of the multiple second routers being all in the list of addresses to be networked, selecting one or more of the multiple second routers as the router to be networked based on at least one of: signal strengths of signals of the multiple second routers as received by the first router; or reception time when the first router receives probe requests of the multiple second routers.

In some embodiments, the probe request carries an organization identifier of the at least one second router and an equipment state of the at least one second router, the method further including:
  determining, based on the probe request received, a signal strength of a signal of the at least one second router as received by the first router;
  in response to an organization identifier of the first router being identical to the organization identifier of the at least one second router, and the equipment state of the at least one second router being an uninitialized state, determining whether the signal strength is greater than or equal to a preset signal strength threshold;
  in response to the signal strength being greater than or equal to the preset signal strength threshold, outputting first prompt information prompting networking authorization.

In some embodiments, the method further includes:
before determining the router to be networked, receiving authorization information returned based on the first prompt information.

In some embodiments, the method further includes:
in response to the organization identifier of the first router differing from the organization identifier of the at least one second router, or the equipment state of the at least one second router being an equipment state other than the uninitialized state, continuing to monitor the probe request.

In some embodiments, the method further includes:
after establishing the connection with the router to be networked, sending configuration information to the router to be networked. The configuration information may be for the router to be networked to implement synchronization of networking information of the first router in networking access.

In some embodiments, the method further includes:
updating an equipment state of the first router; and
including, in a preset field in the networking request to be returned by the first router, an updated equipment state of the first router and a first address of the router to be networked, acquiring the networking matching information.

In some embodiments, the method further includes:
after completing networking, outputting second prompt information indicating completion of networking.

According to an aspect of embodiments of the present disclosure, there is provided a method for networking, including:
  sending a probe request to a first router;
  receiving a networking request carrying networking matching information, the networking request being returned by the first router based on the probe request;
  in response to determining a router networking match according to the networking matching information, enabling wireless access of the router to be networked; and
  completing networking by establishing, based on wireless access of the router to be networked, a connection with the first router.

In some embodiments, the networking matching information includes an organization identifier of the first router, an equipment state of the first router, and a first address.

Determining the router networking match according to the networking matching information may include:
  in response to an organization identifier of the router to be networked being identical to the organization identifier of the first router, a second address of the router to be networked being identical to the first address in the networking matching information, and the equipment state of the first router being a networking state, determining the router networking match.

In some embodiments, the method further includes:
after establishing the connection with the first router, receiving configuration information sent by the first router; and
implementing, based on the configuration information, synchronization of networking information of the first router in networking access.

According to an aspect of embodiments of the present disclosure, there is provided a device for networking, including:
- a first receiving module configured to receive a probe request sent by at least one second router;
- a first determining module configured to determine a router to be networked from the at least one second router according to the probe request;
- a first enabling module configured to return a networking request carrying networking matching information to the router to be networked, and enable wireless access of the first router, the networking matching information being provided to the router to be networked for networking matching; and
- a first establishing module configured to, after the router to be networked has enabled wireless access of the router to be networked based on the networking request, complete networking by establishing, based on wireless access of the first router and wireless access of the router to be networked, a connection with the router to be networked.

In some embodiments, the probe request carries an address of the at least one second router.

The first determining module may be further configured to: determine, based on the probe request received, a signal strength of a signal of the at least one second router as received by the first router; in response to the at least one second router being one second router and an address of the one second router being in a list of addresses to be networked, take the one second router as the router to be networked; and in response to the at least one second router being multiple second routers and addresses of the multiple second routers being all in the list of addresses to be networked, select one or more of the multiple second routers as the router to be networked based on at least one of: signal strengths of signals of the multiple second routers as received by the first router; or reception time when the first router receives probe requests of the multiple second routers.

In some embodiments, the probe request carries an organization identifier of the at least one second router and an equipment state of the at least one second router, and the device may further include:
- a second determining module configured to determine, based on the probe request received, a signal strength of a signal of the at least one second router as received by the first router; in response to an organization identifier of the first router being identical to the organization identifier of the at least one second router, and the equipment state of the at least one second router being an uninitialized state, determine whether the signal strength is greater than or equal to a preset signal strength threshold;
- a first outputting module configured to, in response to the signal strength being greater than or equal to the preset signal strength threshold, output first prompt information prompting networking authorization.

In some embodiments, the device may further include:
- an authorization module configured to, before determining the router to be networked, receive authorization information returned based on the first prompt information.

In some embodiments, the device may further include:
- a monitoring module configured to, in response to the organization identifier of the first router differing from the organization identifier of the at least one second router, or the equipment state of the at least one second router being an equipment state other than the uninitialized state, continue to monitor the probe request.

In some embodiments, the device may further include:
- a first sending module configured to, after establishing the connection with the router to be networked, send configuration information to the router to be networked. The configuration information may be for the router to be networked to implement synchronization of networking information of the first router in networking access.

In some embodiments, the device may further include:
- an updating module configured to update an equipment state of the first router; and
- an including module configured to include, in a preset field in the networking request to be returned by the first router, an updated equipment state of the first router and a first address of the router to be networked, acquiring the networking matching information.

In some embodiments, the device may further include:
- a second outputting module configured to, after completing networking, output second prompt information indicating completion of networking.

According to an aspect of embodiments of the present disclosure, there is provided a device for networking, including:
- a second sending module configured to send a probe request to a first router;
- a second receiving module configured to receive a networking request carrying networking matching information, the networking request being returned by the first router based on the probe request;
- a second enabling module configured to, in response to determining a router networking match according to the networking matching information, enable wireless access of the router to be networked; and
- a second establishing module configured to complete networking by establishing, based on wireless access of the router to be networked, a connection with the first router.

In some embodiments, the networking matching information includes an organization identifier of the first router, an equipment state of the first router, and a first address.

The second enabling module may be further configured to, in response to an organization identifier of the router to be networked being identical to the organization identifier of the first router, a second address of the router to be networked being identical to the first address in the networking matching information, and the equipment state of the first router being a networking state, determine the router networking match.

In some embodiments, the device may further include:
- a third receiving module configured to, after establishing the connection with the first router, receive configuration information sent by the first router; and
- a synchronizing module configured to implement, based on the configuration information, synchronization of networking information of the first router in networking access.

According to an aspect of embodiments of the present disclosure, there is provided a device for networking, including at least a processor and a memory for storing processor executable instructions.

The processor is configured to execute the executable instructions to implement steps of a method herein.

According to an aspect of embodiments of the present disclosure, there is provided a non-transitory computer-readable storage medium having stored therein computer-executable instructions which, when executed by a processor, implement a method for networking herein.

A technical solution provided by embodiments of the present disclosure includes beneficial effects as follows.

In embodiments of the present disclosure, the first router first determines a router to be networked by receiving a probe request, and then makes the router to be networked enable wireless access by returning a networking request to the router to be networked, so as to establish a connection with the router to be networked. That is, with embodiments of the present disclosure, networking is implemented via information exchange between the first router and the router to be networked, and it is not required to determine the router to be networked by manually clicking on a scan operation, or to establish a connection by manually clicking on an add operation to complete networking, simplifying operations, completing networking quickly, improving a degree of intelligence and efficiency of router networking.

What is claimed is:

1. A method for networking, applied to a first router, the method comprising:
receiving a probe request sent by at least one second router, wherein the probe request comprises a first equipment vendor field carrying an address of the at least one second router and an equipment state of the at least one second router, and the equipment state of the at least one second router comprises an uninitialized state, an initialized state, or a networking state; and wherein the initialized state of the at least one second router indicates that the at least one second router is going through networking configuration, and the networking state of the at least one second router indicates that the at least one second router has completed the networking configuration;
determining a router to be networked from the at least one second router according to the probe request, wherein an equipment state of the router to be networked is the uninitialized state;
updating an equipment state of the first router;
including, in a preset field in a networking request to be returned by the first router, an updated equipment state of the first router and a first address of the router to be networked, which form networking matching information, wherein the preset field in the networking request is a second equipment vendor field;
returning the networking request carrying the networking matching information to the router to be networked, and enabling wireless access of the first router, the networking matching information being provided to the router to be networked for networking matching; and
after the router to be networked has enabled wireless access of the router to be networked based on the networking request, completing networking by establishing, based on wireless access of the first router and wireless access of the router to be networked, a connection with the router to be networked.

2. The method of claim 1, wherein the probe request carries an address of the at least one second router, and determining the router to be networked from the at least one second router according to the probe request comprises:
determining, based on the probe request received, a signal strength of a signal of the at least one second router as received by the first router;
in response to the at least one second router being one second router and an address of the one second router being in a list of addresses to be networked, taking the one second router as the router to be networked; and
in response to the at least one second router being multiple second routers and addresses of the multiple second routers being all in the list of addresses to be networked, selecting one or more of the multiple second routers as the router to be networked based on at least one of: signal strengths of signals of the multiple second routers as received by the first router; or reception time when the first router receives probe requests of the multiple second routers.

3. The method of claim 1, wherein the probe request further carries an organization identifier of the at least one second router, the method further comprising:
determining, based on the probe request received, a signal strength of a signal of the at least one second router as received by the first router; in response to an organization identifier of the first router being identical to the organization identifier of the at least one second router, and the equipment state of the at least one second router being the uninitialized state, determining whether the signal strength is greater than or equal to a preset signal strength threshold; and
in response to the signal strength being greater than or equal to the preset signal strength threshold, outputting first prompt information prompting networking authorization.

4. The method of claim 3, further comprising:
before determining the router to be networked, receiving authorization information returned based on the first prompt information.

5. The method of claim 3, further comprising:
in response to the organization identifier of the first router differing from the organization identifier of the at least one second router, or the equipment state of the at least one second router being an equipment state other than the uninitialized state, continuing to monitor the probe request.

6. The method of claim 1, further comprising:
after establishing the connection with the router to be networked, sending configuration information to the router to be networked, the configuration information being for the router to be networked to synchronize networking information of the first router in networking access.

7. The method of claim 1, further comprising:
after completing networking, outputting second prompt information indicating completion of networking.

8. The method of claim 1, wherein each of the first equipment vendor field and the second equipment vendor field comprises equipment vendor customized content.

9. A method for networking, applied to a router to be networked, the method comprising:
sending a probe request to a first router; wherein the probe request comprises a first equipment vendor field carrying an address of the router to be networked and an equipment state of the router to be networked, and the equipment state of the router to be networked is an uninitialized state;
receiving a networking request carrying networking matching information, the networking request being returned by the first router based on the probe request; wherein the networking matching information is formed according to a preset field in the networking request, which includes an updated equipment state of the first router and a first address of the router to be networked; wherein the preset field in the networking request is a second equipment vendor field;

in response to determining a router networking match according to the networking matching information, enabling wireless access of the router to be networked; and completing networking by establishing, based on wireless access of the router to be networked, a connection with the first router.

10. The method of claim 9, wherein the networking matching information comprises an organization identifier of the first router, an equipment state of the first router, and a first address, wherein determining the router networking match according to the networking matching information comprises:

in response to an organization identifier of the router to be networked being identical to the organization identifier of the first router, a second address of the router to be networked being identical to the first address in the networking matching information, and the equipment state of the first router being a networking state, determining the router networking match.

11. The method of claim 9, further comprising:

after establishing the connection with the first router, receiving configuration information sent by the first router; and synchronizing, based on the configuration information, networking information of the first router in networking access.

12. A device for networking, comprising at least a processor and a memory for storing processor executable instructions, wherein the processor is configured to execute the executable instructions to implement the method of claim 9.

13. A device for networking, comprising at least a processor and a memory for storing processor executable instructions, wherein the processor is configured to execute the executable instructions to implement acts comprising:

receiving a probe request sent by at least one second router, wherein the probe request comprises a first equipment vendor field carrying an address of the at least one second router and an equipment state of the at least one second router, and the equipment state of the at least one second router comprises an uninitialized state, an initialized state, or a networking state; and wherein the initialized state of the at least one second router indicates that the at least one second router is going through networking configuration, and the networking state of the at least one second router indicates that the at least one second router has completed the networking configuration;

determining a router to be networked from the at least one second router according to the probe request, wherein an equipment state of the router to be networked is the uninitialized state;

updating an equipment state of the first router;

including, in a preset field in a networking request to be returned by the first router, an updated equipment state of the first router and a first address of the router to be networked, which form networking matching information, wherein the preset field in the networking request is a second equipment vendor field;

returning the networking request carrying the networking matching information to the router to be networked, and enabling wireless access of the first router, the networking matching information being provided to the router to be networked for networking matching; and after the router to be networked has enabled wireless access of the router to be networked based on the networking request, completing networking by establishing, based on wireless access of the first router and wireless access of the router to be networked, a connection with the router to be networked.

14. The device of claim 13, wherein the probe request carries an address of the at least one second router, and the processor is configured to determine the router to be networked from the at least one second router according to the probe request by:

determining, based on the probe request received, a signal strength of a signal of the at least one second router as received by the first router;

in response to the at least one second router being one second router and an address of the one second router being in a list of addresses to be networked, taking the one second router as the router to be networked; and in response to the at least one second router being multiple second routers and addresses of the multiple second routers being all in the list of addresses to be networked, selecting one or more of the multiple second routers as the router to be networked based on at least one of: signal strengths of signals of the multiple second routers as received by the first router; or reception time when the first router receives probe requests of the multiple second routers.

15. The device of claim 13, wherein the probe request carries an organization identifier of the at least one second router, and the processor is further configured to implement acts comprising:

determining, based on the probe request received, a signal strength of a signal of the at least one second router as received by the first router; in response to an organization identifier of the first router being identical to the organization identifier of the at least one second router, and the equipment state of the at least one second router being the uninitialized state, determining whether the signal strength is greater than or equal to a preset signal strength threshold; and in response to the signal strength being greater than or equal to the preset signal strength threshold, outputting first prompt information prompting networking authorization.

16. The device of claim 15, wherein the processor is further configured to implement acts comprising:

before determining the router to be networked, receiving authorization information returned based on the first prompt information.

17. The device of claim 15, wherein the processor is further configured to implement acts comprising:

in response to the organization identifier of the first router differing from the organization identifier of the at least one second router, or the equipment state of the at least one second router being an equipment state other than the uninitialized state, continuing to monitor the probe request.

18. The device of claim 13, wherein the processor is further configured to implement acts comprising:

after establishing the connection with the router to be networked, sending configuration information to the router to be networked, the configuration information being for the router to be networked to implement synchronization of networking information of the first router in networking access.

19. The device of claim 13, wherein the processor is further configured to implement acts comprising:

after completing networking, outputting second prompt information indicating completion of networking.

20. The device of claim 13, wherein each of the first equipment vendor field and the second equipment vendor field comprises equipment vendor customized content.

* * * * *